March 7, 1950 H. MILLIKEN 2,500,085
ENGINE
Filed Aug. 13, 1943 2 Sheets-Sheet 1

INVENTOR
H. MILLIKEN
BY Featherstonhaugh & Co
ATTORNEYS

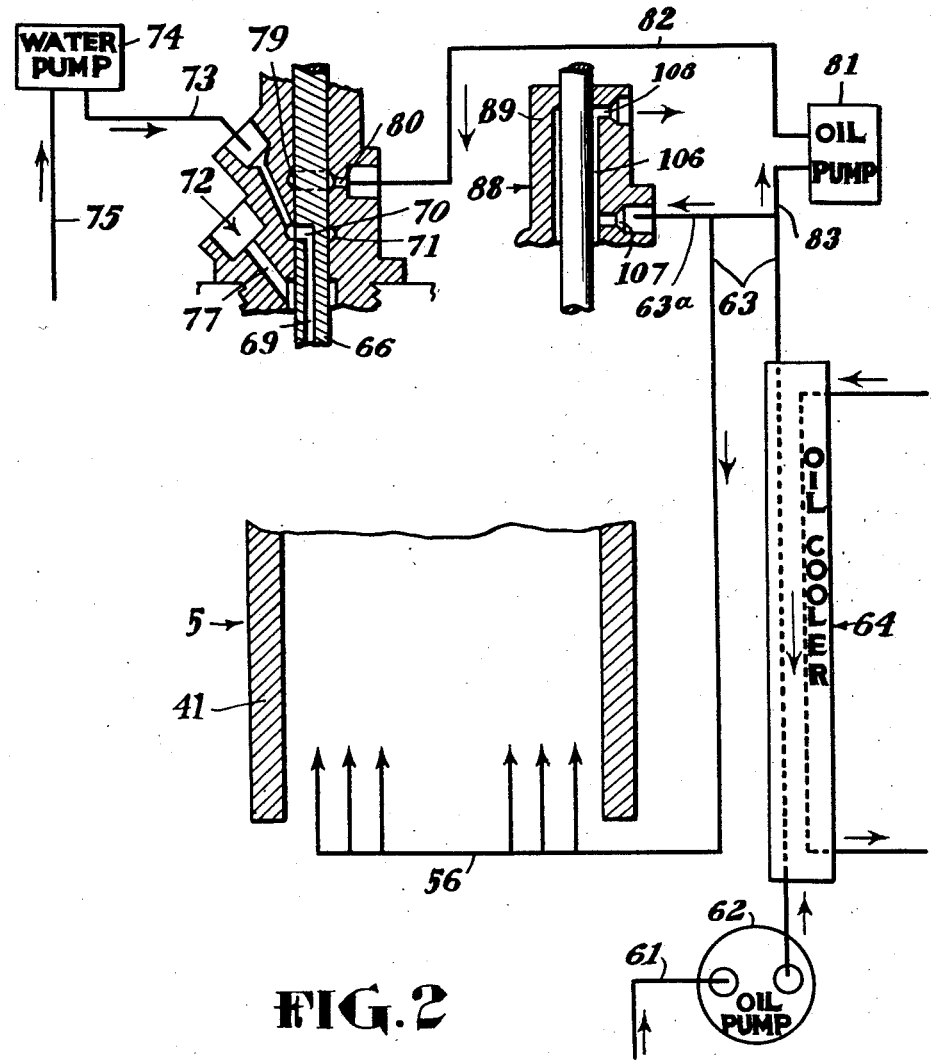

Patented Mar. 7, 1950

2,500,085

UNITED STATES PATENT OFFICE 2,500,085

ENGINE

Humphreys Milliken, Mount Royal, Quebec, Canada

Application August 13, 1943, Serial No. 498,603

2 Claims. (Cl. 123—193)

This invention relates to engines and the main object is to provide an engine designed so that intentional cooling of the cylinders to prevent carbonization of the lubricating oil may be eliminated with a corresponding improvement in the thermal efficiency of the engine.

The present invention is particularly useful as applied to the construction of high pressure engines operated in accordance with the invention set forth in my co-pending application Serial No. 369,027, filed Dec. 14, 1942, now Patent No. 2,404,395, July 23, 1946. It is also applicable to Diesel and similar engines in which the fuel is injected into a body of air previously compressed to a temperature equal to or closely approaching the ignition temperature of the injected fuel.

According to the invention set forth in said co-pending application, heat energy is transformed into useful work with exceptionally high thermal efficiency by a procedure which comprises expanding, in a high pressure engine, an expansible gaseous motive fluid which has been compressed to a relatively high pressure and heated externally of the engine. The motive fluid is formed by burning gasoline or other liquid fuel with a large excess of compressed air in a pressure chamber in which the fuel component of the mixture is ignited to heat and thereby increase the volume of the compressed air, the resulting mixture being conducted, with the least possible loss of pressure, directly to the inlet valve of the high pressure engine in which it is expanded, to provide power. The inlet and exhaust valves of the engine are operated in the same sequence as the corresponding valves of a steam engine and a large percentage of the heat contained in the gases discharged through the exhaust valve is recovered and utilized to heat the compressed air before the latter enters the pressure chamber, thereby reducing the quantity of fuel required to produce a given amount of mechanical work.

When the cylinder and piston elements of the high pressure engine referred to in the preceding paragraph are designed in accordance with conventional practice they must be cooled externally as otherwise they would be heated to a red heat by the high temperature motive fluid and the film of lubricating oil on the rubbing surfaces thereof would soon carbonize and lose its lubricating value. The cooling, which is usually accomplished by circulating a cooling medium through suitable cooling jackets or by directing cold air against the cylinders, is responsible for loss of power amounting to approximately 25 to 40% of the heat energy in the fuel. The present invention eliminates this source of loss of power and thermal efficiency by providing an engine in which a suitable portion of the total length of each piston, including the piston head, is always separated from the surrounding inner annular wall surface of the cylinder by an intervening gas-receiving space which is always in open communication with the cylinder space above the piston head, the remaining portion of the length of the piston being equipped with piston rings and arranged to travel in rubbing contact with a relatively small proportion of the total length of the cylinder wall as compared with conventional practice. In this case the lubricating oil is supplied only to the relatively cooler portion of the length of the cylinder wall which is contacted by the piston. By thus confining rubbing contact between the piston and cylinder elements to a relatively short and cool section of the cylinder located a substantial distance from the fuel inlet valve and supplying cool lubricating oil only to said piston engaging section of the cylinder, I make it feasible to eliminate the usual cooling system without danger of the oil becoming carbonized to the point where it loses its lubricating value. As a matter of fact, the portion of the length of the cylinder which is free of rubbing contact with the piston may be, and preferably is, covered by heat insulating material to reduce heat losses due to conduction and radiation.

Other objects, advantages and characteristic features of the invention will become apparent from the following detailed description of the preferred embodiment shown in the accompanying drawings, in which—

Fig. 2 is a diagram illustrating one form of lubricating system which may be used with the engine shown in Fig. 1. This view also shows means for supplying a cooling fluid to the inlet valve of the engine.

Figure 1:
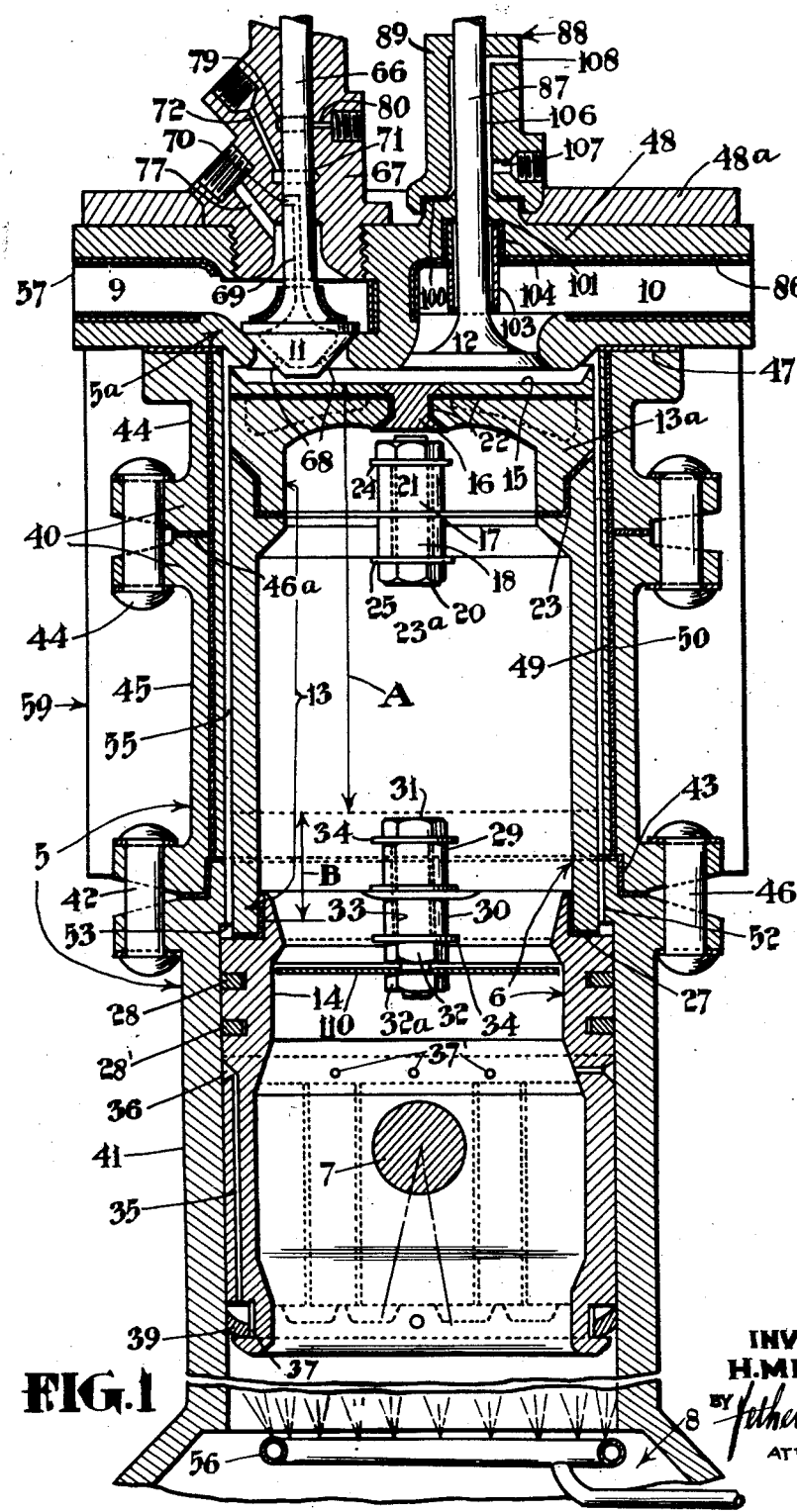
Fig. 1 is a longitudinal sectional view of an engine embodying my invention.

In these drawings the cylinder and piston elements of my improved engine are respectively indicated at 5 and 6. The piston carries a wrist pin 7 adapted to be conventionally connected to a crank shaft (not shown) journalled in the crank case 8. The cylinder head inlet and exhaust passages are respectively indicated at 9 and 10 and are controlled by suitable inlet and exhaust valves 11 and 12.

This piston is here shown as a two-diameter piston comprising an upper section 13 of reduced diameter compared with the lower section 14, the relative terms "upper" and "lower" being here used simply for convenience since it is obvious that the engine may be arranged either vertically or horizontally. The section 13 includes and is closed at its upper end by a piston head 13a which is covered by an upwardly flanged heat-resisting disk 15 secured in place by a rivet 16. The piston head may be formed as an integral part of section 13 but is here shown as a separately formed part provided with a lug 17 which is fastened to a lug 18 of the remaining part of section 13 by a fastening bolt 20 and a clamping nut 21. The disk 15 and rivet 16 are separated from the piston head by heat insulating material 22 and the piston head, in turn, is separated from the remaining part of section 13 by heat insulating material 23. The lugs 17 and 18 are also separated from the associated bolt 20 and nut 21 by heat insulating bushing 23a and heat insulating washers 24 and 25.

While only one bolt connection 20 is shown between piston head 13a and piston section 13, it will be understood that any suitable number of such connections will be provided in actual practice.

Piston sections 13 and 14 may be integral with each other but are here shown as separate sections detachably secured together with heat insulating material 27 interposed therebetween. In the present instance a lug 29 of section 13 is shown fastened to a lug 30 of section 14 by a bolt 31 and a clamping nut 32, the bolt and nut being insulated from said lugs by heat insulating bushing 33 and heat insulating washers 34. While only one bolt connection 31 is shown between the piston sections 13 and 14, it will be understood that two or more of such bolt connections are provided in actual practice.

The piston section 14 is provided with piston rings 28 and 28' located adjacent the end of said section which is bolted to the companion section 13. Piston section 14 is also provided with a plurality of longitudinally extending oil circulating ports 35 located at the side of the piston ring 28' remote from the piston section 13. An oil distributing groove 36 is formed in the cylinder engaging surface of piston section 14 and communicates with the ends of the ports 35 nearest piston ring 28'. An oil collecting groove 37 is also formed in the cylinder engaging surface of piston section 14 and communicates with the remaining ends of the oil circulating ports 35.

A split and expansible oil collecting ring 39 is arranged in groove 37 and serves, during the return stroke of the piston, to scrape oil from the cylinder wall and to cause such oil to be circulated through said ports 35 from the oil collecting groove 37 to the oil distributing groove 36. The upper surface of ring 39 is shaped so that its outer edge serves as a scraper for scraping oil from the cylinder wall during the return stroke of the piston. The lower outer corner portion of ring 39 is curved or rounded off so that, during the working stroke of the piston, the ring slides over the oil film on the cylinder wall.

For convenient description the form of cylinder shown in the present drawings may be regarded as comprising main sections 40 and 41 which are fastened together by bolts 42 with insulation 43 interposed between their adjacent ends. Cylinder section 41 is here shown as a single section formed integral with the crank case 8. Cylinder section 40 may also be formed as a single section but is here shown as divided into separate parts 44 and 45 which are fastened together by bolts 46 with heat insulating material 46a interposed between their adjacent ends. A gasket 47 is interposed between the upper end of cylinder section 40 and the cylinder head 48 which is fastened in place in any usual or convenient manner.

The cylinder section 40 is provided with a metal liner 49 which is separated therefrom by interposed heat insulating material 50, said liner being force-fitted in place after the cylinder parts 44 and 45 have been bolted together and lined with the insulating material 50. The inside diameter of the metal liner 49 is slightly greater than the outside diameter of piston section 13 but is less than the inside diameter of the major portion of the cylinder section 41. In this connection it will be noted that cylinder section 41 is provided, at its upper end, with an inwardly flanged portion 52 whose inner surface is flush with the inner surface of the metal liner 49 and is offset inwardly with respect to the inner surface of the remaining portion of the length of cylinder section 41. This construction provides a downwardly facing shoulder 53 adjacent the upper end of cylinder section 41. It will be apparent from this description that the diameter of the lower section 41 is, in the main, larger than the diameter of the upper cylinder section 40.

In the present drawings the length of the piston stroke is indicated by the line A and is less than the length of the piston section 13 by approximately the amount indicated by the line B.

It is also important to note at this point that the piston section 13 is always separated from the surrounding wall of the cylinder by an annular clearance space 55 and that rubbing contact between the cylinder and piston is confined to that portion of the length of cylinder section 41 which is traversed by the piston section 14, the latter being an easy guiding fit in cylinder section 41 and being dimensioned to prevent wobbling of piston section 13 into contact with any part of the cylinder. Lubricating oil is sprayed onto the inner surface of cylinder section 41 by a spray pipe 56 but there is no lubricating oil on the surfaces of the piston section 13 and the cylinder section 40.

When the engine described herein is operated in accordance with the invention disclosed in my co-pending application a gaseous mixture of hot burned fuel and air is maintained at high pressure in the inlet passage 9 and is admitted to cylinder 5 by the opening of inlet valve 11 which occurs as the piston reaches the end of its return or exhaust stroke. Value 11 remains open until the piston has moved through a distance equal to approximately ¼ of its working stroke whereupon valve 11 closes and remains closed until the piston has completed its working stroke and it is nearing the end of its return or exhaust stroke. It will thus be seen that valve 11 remains closed about ⅞ of the time required to complete a cycle of operation and, during this time, the hot pressure gases stand in the inlet passage 9. Consequently, in order to minimize the dissipation of heat energy through the metal walls of passage 9 it is important that this passage be lined with heat insulating material as indicated at 57.

At the beginning of the working stroke of the piston the hot pressure gases admitted to the cylinder through valve 11 begin to enter the extremely narrow clearance space 55 (compressing the cooler gases already in said clearance space) with decreasing flow which ceases when the pressure in said clearance space is equalized with the pressure in the cylinder space between the piston head 13a and the cylinder head 48. The piston rings 28 and 28' seal the lower end of the clearance space between piston section 13 and the cylinder and thus prevent gas blowing past the piston section 14 into the crank case 8. The clearance space 55 is of such small volume that it is equal to only a negligible percentage of the volume of the piston displacement. For example, a piston section 13 having a diameter of 4" might be separated from cylinder section 40 by an annular clearance space of .010" in which case cylinder section 40 would have an inside diameter of 4.020". Squaring the latter gives 16.16 which is 1% greater than the square of the aforesaid diameter of piston section 13. The clearance volume is therefore 1% of the displacement of piston section 13. This does not mean that 1% of the gas entering the cylinder section 40 is wasted. In this connection it is noted that clearance space 55 provides a gas passage which is so narrow in proportion to its length (the latter being about 4") there is not sufficient time available to completely fill this passage with gases at inlet pressure even when the engine is operating at the moderate speed of 1500 R. P. M. and the time available for filling the gas passage is computed as being one-half the time required for the piston to complete its working stroke. With the engine operating at 1500 R. P. M. the available time is about .01 of a second and is much less than the time required for completely filling the gas passage with gases at inlet pressure. There is a similar time lag in the discharge of the gases from the clearance space or gas passage during the exhaust stroke of the engine. Hence, it is only in the uppermost portion of gas passage 55 that the gas pressure varies or oscillates through the full range from inlet to exhaust pressure since the amplitude of such pressure oscillations will gradually diminish to negligible value before reaching the lower end of said passage. It is thus apparent that the volume of the inlet gases which enter and leave the gas passage afforded by the small clearance space 55 is less than 1% of the total volume entering the cylinder through the inlet valve 9.

It is important to minimize the heat radiated from the cylindrical surface of piston 13 to the lubricated surface of cylinder 41 during the time the piston is at or near the end of its working stroke (crank-end). Several features of the invention contribute to that purpose. The diameter of cylinder 41 and piston 14 are of substantially larger diameter than the internal diameter of metal liner 49 (in cylinder 45); therefore the annular space between 13 and 41 (when piston is at or near end of working stroke) is much greater than the annular space between 13 and 49 (when piston is at or near beginning of working stroke). The amount of heat radiated from 13 to lubricated surface 41 is thereby greatly reduced. It should be noted that there is no offsetting disadvantage in making the diameter of 41 substantially larger than the diameter of 13 and 49; such construction does not increase the volume of gas flowing between 13 and 49; the gas between 13 and 41 is alternately compressed and expanded producing maximum and minimum pressure in this space synchronously with the maximum and minimum pressure in the head-end of the cylinder, the pressure between 13 and 41 being roughly one-half the pressure in the head-end of cylinder.

The invention provides a further means of minimizing the heat radiation between 13 and 41, viz.: piston 13 is divided into sections 15, 13 and 13a with heat insulation between the three parts; this minimizes the temperature of the main portion of 13 (which is the only portion of the unlubricated piston extension coming within 41), because the length of stroke is limited so that the hotter portions, 15 and 13a, do not enter the space within the lubricated cylinder 41.

The flat end 15 and the cylinder liner-surface 49 are made extremely thin and therefore flexible; they can safely work at higher temperature than the thicker and more rigid parts which would be subjected to unsafe internal strains due to unequal expansion of inner and outer portions, if worked at extremely high temperature. Such subdivision therefore permits higher gas temperature and higher thermal efficiency.

The cylinder and piston elements of the engine described herein should be made of metal capable of withstanding red heat without serious loss of strength. The cylinder section 40 is shown covered by a heat insulating jacket 59 and a similar jacket may, if desired, be applied to cylinder section 41. By thus minimizing heat losses through the cylinder and eliminating the conventional cooling system I increase the efficiency of the engine by maintaining practically adiabatic expansion, thereby ensuring higher mean effective pressure and permitting a higher expansion ratio and a longer stroke. The temperature of the exhaust is also increased so that it furnishes more heat energy to the compressed air used in forming the gaseous motive fluid and thereby reduces fuel consumption.

In spite of the heat insulating material separating the non-lubricated sections of the piston and cylinder from the lubricated sections, the latter become heated to an extent which makes it desirable that the lubricating oil be supplied thereto in a cool condition to ensure against carbonization of the oil. This may be accomplished, as indicated in Fig. 2, by passing oil from the crank case of the engine through line 61 to the inlet side of a pressure pump 62 having its pressure side connected, by oil line 63, to the previously mentioned spray pipe 56, a portion of line 63 being passed through an oil cooler 64 which cools the hot crank case oil down to a sufficiently low temperature. It will thus be seen that cool oil is continuously and positively supplied to the lower portion of cylinder section 41 and uniformly distributed by the circulating system comprising the piston ports 35, grooves 36 and 37 and ring 39. The groove 36 is provided with drain opening 37' through which a certain amount of hot oil is forced at each return stroke of the piston, such hot oil dripping into the crank case and being sucked out by the pump 62 for recooling and recirculation.

Valve 11 is carried by a stem 66 which slides in a lubricated guide 67. Valve 11 is here shown as a hollow member provided with ports 68 placing the interior thereof in communication with the cylinder. The interior of valve 11 is also in open communication with the lower end of a small-diameter longitudinally extending bore 69 provided in stem 66. When valve 11 is opened the laterally directed upper end 70 of bore 69 registers with a groove 71 provided in the stem guide 67 at the inner end of a port 72 whose outer end is connected, by line 73, (Fig. 2) to the pressure side of a water pump 74 to which water is supplied through line 75. When valve 11 is opened a fine stream of cooling water passes into stem 66 and is quickly vaporized and superheated, the steam and vapors thus generated escaping from valve 11 through ports 68 and mixing with the pressure gases and air, thus adding slightly to their volume and to the mechanical power applied to the piston. When valve 11 is closed the port 69 is moved out of registration with groove 71 and the supply of water to said port 69 is discontinued during the expansion and exhaust strokes of the engine. Since the heat of evaporation is high a small amount of water passing through the stem 66 will have a great effect in cooling the valve.

The valve stem 69 is further cooled by forcing compressed air inwardly through a port 77 provided in the valve stem guide 67. The compressed air here referred to is at a much lower temperature than the motive fluid gases supplied through inlet 9, the temperature of said gases being approximately 2500° F. while the temperature of the compressed air is about 600° F. The pressure of the compressed air forced through port 77 is slightly higher than the pressure of the motive fluid gases in inlet passage 9 but the inner portion of said port is of such small cross section in comparison with said inlet passage that the quantity of compressed air entering said passage is relatively very small. This cooler compressed air surrounds the lower end of the valve stem and the upper side of the valve and mixes with the hot gases, the resulting mixture passing into the cylinder without loss of heat energy when valve 11 is opened.

Valve stem guide 67 is provided with a groove 79 and a port 80 to which cooled or refrigerated lubrication oil is supplied from the pressure side of a high pressure pump 81 through line 82, the inlet side of said pump being connected, by branch connection 83, to the line 63 at a point above the oil cooler 64. The lubricating oil is supplied to groove 79 at a pressure slightly higher than the gas pressure in inlet passage 9. It fills the small clearance space between the valve stem and valve guide and forms an oil seal between these parts which prevents the gases in passage 9 leaking to atmosphere around said stem. The cold oil is forced upwardly from groove 79, increasing in temperature, and spills over the top of the stem guide, the overflow being collected in any suitable manner and returned to the lubricant circulating system for recooling and recirculation. In this case the metal parts are at a higher temperature than the oil at its hottest point which is, of course, the reverse of the conditions obtaining in a conventional engine when the cooling medium is applied to the outside of the valve-stem guide. Consequently, in the case of the present invention, less heat energy is taken from the engine in order to maintain a given maximum oil temperature and the thermal efficiency of the engine is thereby increased.

Similar principles of heat conservation are applied to the exhaust passage 10 and exhaust valve 12. In an engine of the type provided by the present invention it is important to conserve the heat of the exhaust gas since such heat is utilized in the heat interchanger, as set forth in my prior application, to raise the temperature and volume of the compressed air supplied to the pressure chamber in which the gaseous motive fluid is generated. With this consideration in mind the exhaust passage 11 is provided with an insulating lining 86 and the exhaust valve 12 is carried by a stem 87 which slides in a sectional stem guide 88 comprising an upper section 89 which is separated, by heat insulating material 100, from the lower section 101 which constitutes an integral part of the cylinder head. The insulating material 100 materially reduces the flow of heat to the upper stem-guide section 89. The lower end of valve stem 87 is protected from the hot exhaust gases by a cylindrical shield 103 which surrounds the stem with a small amount of clearance, said shield being carried by the lower stem-guide section 101 and being insulated therefrom by suitably interposed heat insulating material indicated at 104.

An oil circulating jacket 106, having an inlet port 107 at its lower end and a discharge port 108 at its upper end, is formed by and between the valve stem 87 and a surrounding portion of the upper stem-guide section 89. Cooled or refrigerated oil is supplied under pressure to port 107 through a branch connection 63a of oil line 63 and rises in the jacket 106 until it overflows through port 108, the overflow being collected and returned in any suitable manner to the oil circulating system for recooling and recirculation. The pressure of the oil supplied to port 107 is about the same as the exhaust pressure which is about 5 lbs. above atmospheric pressure. Hence, practically no oil passes down the stem 87 into the exhaust passage 10.

In view of the means described herein for cooling the valves 11 and 12 the cylinder head 48 may be covered with heat insulating material 48a to further reduce the loss of heat energy.

A diaphragm 110 is preferably fitted in the upper portion of the piston section 14, being secured in place by the bolts 31 and clamping nut 32a. This diaphragm serves to prevent oil or vapors from the crank case coming into contact with the interior surface of the upper piston section 14. This is desirable since the piston section 13 is hot enough to carbonize the oil or possibly cause an explosion in the crank case. The diaphragm also serves to minimize loss of heat energy from the gas which might otherwise result from the highly heated air within the piston section 13 being intermingled with the cooler air in the crank case. The diaphragm 110 is not an airtight fit in the piston section 14 but is arranged to permit a sufficient slow flow of air past the diaphragm to prevent unnecessary stress on the diaphragm due to changes in temperature.

Having thus described my invention, what I claim is:

1. An engine comprising a cylinder having a head-end and a crank-end and having a portion of its length extending from an intermediate point to the crank-end of larger internal diameter than the portion extending from said intermediate point to the head-end, a piston operating in said cylinder and having a portion of its length extending from an intermediate point to the crank-end of larger outside diameter than the remaining portion of its length, the larger portion of the piston being arranged to operate in the larger portion of the cylinder and being an easy sliding fit therein with lubrication, the smaller portion of the piston being dimensioned to operate in the smaller portion of the cylinder with minimum clearance to avoid rubbing, means for supplying lubricant only to the rubbing surfaces of the larger portions of the cylinder and piston so that the smaller portions of the cylinder and piston are left free of lubricant, a cylindrical lining of relatively thin metal located in the smaller non-lubricated portion of the cylinder and separated from the surrounding cylindrical wall and from the cylinder head by solid heat insulation, said engine being characterized in that the annular space between the lubricated cylinder surface and the non-lubricated piston surface is closed except for the minimum clearance reserved between the non-lubricated surfaces of the smaller portions of the cylinder and piston.

2. An engine comprising a cylinder, a piston reciprocating therein, a portion of said piston having a diameter larger than the diameter of the remainder of said piston, a portion of said cylinder having a diameter larger than the remainder of said cylinder, the portion of said piston having the larger diameter and the portion of said cylinder having the larger diameter being dimensioned for a sliding fit, the sliding surfaces of the said larger diameter portions of the piston and cylinder being lubricated, said engine being further characterized in that the portion of said piston having the smaller diameter and the portion of said cylinder having the smaller diameter are dimensioned for relative motion without rubbing and in that the annular space between the lubricated portion of said cylinder and the non-lubricated portion of said piston has no gas passage to other parts of the engine except the annular space between the non-lubricated portions of the cylinder and piston, said engine being further characterized in that the portion of the piston having the smaller diameter is sectionalized by heat insulation so located that the insulating joint between the sections of said portion of the piston does not enter the lubricated portion of said cylinder.

HUMPHREYS MILLIKEN.

REFERENCES CITED

The following references are of record in the file of this patent:

UNITED STATES PATENTS

| Number | Name | Date |
|---|---|---|
| 313,923 | Daimler | Mar. 17, 1885 |
| 630,838 | Anderson | Aug. 15, 1899 |
| 678,823 | Bramwell | July 16, 1901 |
| 704,713 | Klein | July 15, 1902 |
| 927,103 | Bogert | July 6, 1909 |
| 1,030,213 | Tremolieres | June 18, 1912 |
| 1,609,449 | Williams | Dec. 7, 1926 |
| 1,616,391 | Prouty | Feb. 1, 1927 |
| 1,816,516 | Clement | July 28, 1931 |
| 1,898,730 | Kaw | Feb. 21, 1933 |
| 2,166,857 | Bugatti | July 15, 1939 |

FOREIGN PATENTS

| Number | Country | Date |
|---|---|---|
| 375,763 | France | of 1907 |